(12) United States Patent
Seregin

(10) Patent No.: US 9,491,459 B2
(45) Date of Patent: Nov. 8, 2016

(54) BASE LAYER MERGE AND AMVP MODES FOR VIDEO CODING

(71) Applicant: QUALCOMM Incorporated, San Diego, CA (US)

(72) Inventor: Vadim Seregin, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 303 days.

(21) Appl. No.: 14/037,281

(22) Filed: Sep. 25, 2013

(65) Prior Publication Data

US 2014/0086329 A1 Mar. 27, 2014

Related U.S. Application Data

(60) Provisional application No. 61/706,512, filed on Sep. 27, 2012, provisional application No. 61/707,066, filed on Sep. 28, 2012.

(51) Int. Cl.
*H04N 19/33* (2014.01)
*H04N 19/56* (2014.01)
*H04N 19/52* (2014.01)

(52) U.S. Cl.
CPC .......... *H04N 19/0066* (2013.01); *H04N 19/33* (2014.11); *H04N 19/52* (2014.11); *H04N 19/56* (2014.11)

(58) Field of Classification Search
CPC .. H04N 19/0066; H04N 19/33; H04N 19/52; H04N 19/56
USPC .................................................... 375/240.16
See application file for complete search history.

(56) References Cited

U.S. PATENT DOCUMENTS

| | | | | |
|---|---|---|---|---|
| 2002/0150158 A1* | 10/2002 | Wu | ........................ | H04N 19/34 375/240.12 |
| 2003/0133500 A1* | 7/2003 | Auwera | ................. | H04N 19/63 375/240.11 |
| 2003/0215011 A1* | 11/2003 | Wang | ................... | H04N 19/176 375/240.03 |

(Continued)

FOREIGN PATENT DOCUMENTS

| | | | | |
|---|---|---|---|---|
| EP | 1806930 A1 | | 7/2007 | |
| EP | 1806930 A1 * | | 7/2007 | ............... H04N 7/26 |

(Continued)

OTHER PUBLICATIONS

Tammy Lee et al, "Non-CE13: Additional merge candidates with MV dependent offsets", 2011.*

(Continued)

*Primary Examiner* — Shan Elahi
(74) *Attorney, Agent, or Firm* — Knobbe, Martens, Olson & Bear, LLP

(57) ABSTRACT

A method of decoding video data includes receiving syntax elements extracted from an encoded video bitstream and determining a candidate list for an enhancement layer block. The syntax elements include information associated with a base layer block of a base layer of the video data. The candidate list is determined, in a base-layer inter-layer prediction mode, based only on motion information associated with the base layer block. The enhancement layer block is in an enhancement layer of the video data. The candidate list includes a merge list or an AMVP list. A syntax element can be received that indicates whether to apply the base-layer inter-layer prediction mode.

30 Claims, 7 Drawing Sheets

(56) References Cited

U.S. PATENT DOCUMENTS

| | | | |
|---|---|---|---|
| 2005/0018911 A1* | 1/2005 | Deever | H04N 19/597 382/232 |
| 2005/0163211 A1* | 7/2005 | Shanableh | H04N 19/29 375/240.1 |
| 2005/0207498 A1* | 9/2005 | Vitali | H04N 19/94 375/240.16 |
| 2006/0008003 A1* | 1/2006 | Ji | H04N 19/63 375/240.11 |
| 2006/0008038 A1* | 1/2006 | Song | H04N 19/63 375/350 |
| 2006/0153295 A1* | 7/2006 | Wang | H04N 19/159 375/240.08 |
| 2006/0222078 A1* | 10/2006 | Raveendran | H04N 21/2365 375/240.16 |
| 2009/0034629 A1* | 2/2009 | Suh et al. | 375/240.27 |
| 2010/0220789 A1* | 9/2010 | Yuwen et al. | 375/240.16 |
| 2010/0232520 A1* | 9/2010 | Wu et al. | 375/240.26 |
| 2012/0008688 A1* | 1/2012 | Tsai et al. | 375/240.16 |
| 2012/0063516 A1* | 3/2012 | Kwon et al. | 375/240.16 |
| 2012/0128060 A1* | 5/2012 | Lin | H04N 19/00696 375/240.02 |
| 2012/0219060 A1 | 8/2012 | Chen et al. | |
| 2012/0230408 A1* | 9/2012 | Zhou | H04N 19/105 375/240.15 |
| 2012/0236941 A1* | 9/2012 | Lin et al. | 375/240.16 |
| 2012/0257678 A1* | 10/2012 | Zhou et al. | 375/240.16 |
| 2012/0263231 A1* | 10/2012 | Zhou | H04N 19/52 375/240.12 |
| 2012/0314027 A1* | 12/2012 | Tian | H04N 7/181 348/43 |
| 2012/0320984 A1* | 12/2012 | Zhou | H04N 19/50 375/240.16 |
| 2013/0016787 A1* | 1/2013 | Kim | H04N 19/176 375/240.16 |
| 2013/0051454 A1* | 2/2013 | Sze | H04N 19/70 375/240.02 |
| 2013/0070854 A1* | 3/2013 | Wang et al. | 375/240.16 |
| 2013/0107962 A1 | 5/2013 | Sim et al. | |
| 2013/0188718 A1 | 7/2013 | Chen et al. | |
| 2013/0294513 A1* | 11/2013 | Seregin et al. | 375/240.14 |
| 2014/0092975 A1* | 4/2014 | Yu | H04N 19/52 375/240.16 |
| 2014/0247878 A1* | 9/2014 | Xu | H04N 19/52 375/240.16 |

FOREIGN PATENT DOCUMENTS

| | | | | |
|---|---|---|---|---|
| WO | 2012167713 A1 | 12/2012 | | |
| WO | WO-2012167711 A1 | 12/2012 | | |
| WO | WO 2012167711 A1 * | 12/2012 | | H04N 7/26 |
| WO | 2013000575 A1 | 1/2013 | | |

OTHER PUBLICATIONS

Schwarz et al "Further experiments for an MCTF extension of H.264", 2004.*
Laroche et al "Robust solution for the AMVP parsing issue", 2011.*
Hong et al "Scalability Support in HEVC", 2011.*
Yu et al, Parallel AMVP Candidate List Construction for HEVC, 2012.*
Boyce J. et al., "Information for HEVC scalability extension", 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG.16); URL: http://wftp3.itu.int/av-arch/jctvc-site/ No. JCTVC-G078, Nov. 8, 2011, pp. 1-7.
Chen J., et al., "Description of scalable video coding technology proposal by Qualcomm (configuration 1)", 11. JCT-VC Meeting; 102. MPEG Meeting; Oct. 10, 2012-Oct. 19, 2012; Shanghai; (Joint Collaborative Team on Video Coding of ISO/IEC JTC1/SC29/WG11 and ITU-T SG.16); URL:http://wftp3.itu.int/av-arch/jctvc-site/, No. JCTVC-K0035, Oct. 2, 2012 (Oct. 2, 2012), XP030112967, pp. 1-19.
Hong D. et al., "Scalability Support in HEVC," Joint Collaborative Team on Video Coding (JCT-VC) of ITU-T SG16 WP3 and ISO/IEC JTC1/SC29/WG11, 6th Meeting: Torino, IT, Jul. 14-22, 2011, Document: JCTVC-F290, pp. 1-15.
International Search Report and Written Opinion—PCT/US2013/061981—ISA/EPO—Dec. 2, 2013.
Lee T. et al., "Non-CE13: Additional merge candidates with MV dependent offsets 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG.16); URL:http://wftp3.itu.int/av-arch/jctvc-site/" No. JCTVC-G787, Nov. 9, 2011 (Nov. 9, 2011), pp. 1-8; XP030110771.
Schwarz et al., "Further experiments for an MCTF extension of H.264", 23. VCEG Meeting; 69. MPEG Meeting; Jul. 17, 2004-Jul. 23, 2004; Redmond, WA, US; (Video Coding Experts Group of ITU-TSG.16), No. VCEG-W06, Jul. 15, 2004 (Jul. 15, 2004), pp. 1-7; XP030003415, ISSN: 000-0454.

* cited by examiner

BASE LAYER MERGE AND AMVP MODES FOR VIDEO CODING

This application claims benefit to U.S. Provisional Patent Application No. 61/706,512 entitled "BASE LAYER MERGE AND AMVP MODES" filed on Sep. 27, 2012, and U.S. Provisional Patent Application No. 61/707,066 entitled "MODE GROUPING AND CODING FOR SVC" filed on Sep. 28, 2012; the disclosures of these applications are hereby incorporated by reference in their entirety.

TECHNICAL FIELD

This disclosure relates to video coding and compression and, in particular, to scalable video coding (SVC).

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques related to candidate list (e.g., a merge list and/or an advanced motion vector prediction (AMVP) list, as well as others) construction. In some embodiments, motion information of a collocated base layer block is used to create the candidate list. The motion information may include: (a) one or more motion vectors or (b) one or more motion vectors and reference indexes. In a base-layer inter-layer prediction mode, the current block at an enhancement layer may determine the candidate (e.g., Merge/AMVP) list based only on motion information associated with the base layer block. For example, the current block at an enhancement layer may use the same Merge/AMVP candidate list that would be created in normal Merge/AMVP modes for its collocated base layer block. If spatial resolutions of the base and enhancement layers are different, the motion vectors derived from the base layer may be scaled. Such techniques for constructing a candidate list for Merge and/or AMVP modes advantageously provide additional control over coding efficiency and performance when processing video information. Coding efficiency may be improved and performance may be improved using the techniques and devices described herein.

In accordance with some embodiments, a video coder for processing video data includes a processor and a memory. The memory can be configured to store video data comprising a base layer block of a base layer. The processor is in communication with the memory. In a base-layer inter-layer prediction mode, the processor is configured to determine a candidate list for an enhancement layer block based only on motion information associated with the base layer block, the motion information comprising one or more motion information candidates, the enhancement layer block being in an enhancement layer of the video data. The candidate list can comprise a merge list or an AMVP list.

In some embodiments, the base layer block is collocated with the enhancement layer block. In other embodiments, the base layer block is a sub-block within a block in the base layer that is collocated with the enhancement layer block. The processor can be further configured to generate a syntax element to indicate whether to apply the base-layer inter-layer prediction mode. The processor can be further configured to scale the one or more motion information candidates associated with the base layer block according to a spatial scalability ratio between the base layer and the enhancement layer.

In some embodiments, in a skip mode, the processor can be further configured to set any residuals associated with the one or more motion information candidates equal to zero. The processor can be further configured to generate a syntax element to indicate whether to apply the skip mode. In some embodiments, the processor can be further configured to perform coding in at least the following order: an IntraBL skip mode, the base-layer inter-layer prediction skip mode, a merge skip mode, an IntraBL mode, the base-layer inter-layer prediction non-skip mode, a merge mode, and an Intra prediction mode.

The processor can be further configured to generate a syntax element to indicate which one of the one or more motion information candidates in the candidate list to use for prediction of the enhancement layer block. In addition, the processor can be further configured to selectively prune any redundancies in the one or more motion information candidates in the candidate list.

In another embodiment, a method of decoding video data includes receiving syntax elements extracted from an encoded video bitstream and determining a candidate list for an enhancement layer block. The syntax elements include information associated with a base layer block of a base layer of the video data. In a base-layer inter-layer prediction mode, the candidate list for an enhancement layer block is based only on motion information associated with the base layer block. The enhancement layer block is in an enhancement layer of the video data. The motion information includes one or more motion information candidates. The candidate list can include a merge list or an AMVP list.

In another embodiment, a method of encoding video data includes receiving information associated with a base layer block of a base layer of the video data, determining a candidate list for an enhancement layer block, and generating at least one syntax element associated with the candidate list. In a base-layer inter-layer prediction mode, the candidate list for an enhancement layer block is based only on motion information associated with the base layer block. The enhancement layer block is in an enhancement layer of the video data. The motion information includes one or more motion information candidates. The candidate list can include a merge list or an AMVP list.

In another embodiment, a video coding apparatus includes means for processing one or more syntax elements associated with a video bit stream, wherein the one or more syntax elements comprise information associated with a base layer block of a base layer of the video data; and means for determining, in a base-layer inter-layer prediction mode, a candidate list for an enhancement layer block based only on motion information associated with the base layer block, the motion information comprising one or more motion information candidates, the enhancement layer block being in an enhancement layer of the video data, wherein the candidate list comprises a merge list or an AMVP list.

In yet another embodiment, a non-transitory computer readable medium having stored thereon includes code that when executed causes an apparatus to: receive information associated with a base layer block of a base layer of video data; and determine, in a base-layer inter-layer prediction mode, a candidate list for an enhancement layer block based only on motion information associated with the base layer block, the motion information comprising one or more motion information candidates, the enhancement layer block being in an enhancement layer of the video data, wherein the candidate list comprises a merge list or an AMVP list.

The details of one or more examples are set forth in the accompanying drawings and the description below. Other features, objects, and advantages will be apparent from the description and drawings, and from the claims.

DETAILED DESCRIPTION

Figure 1:
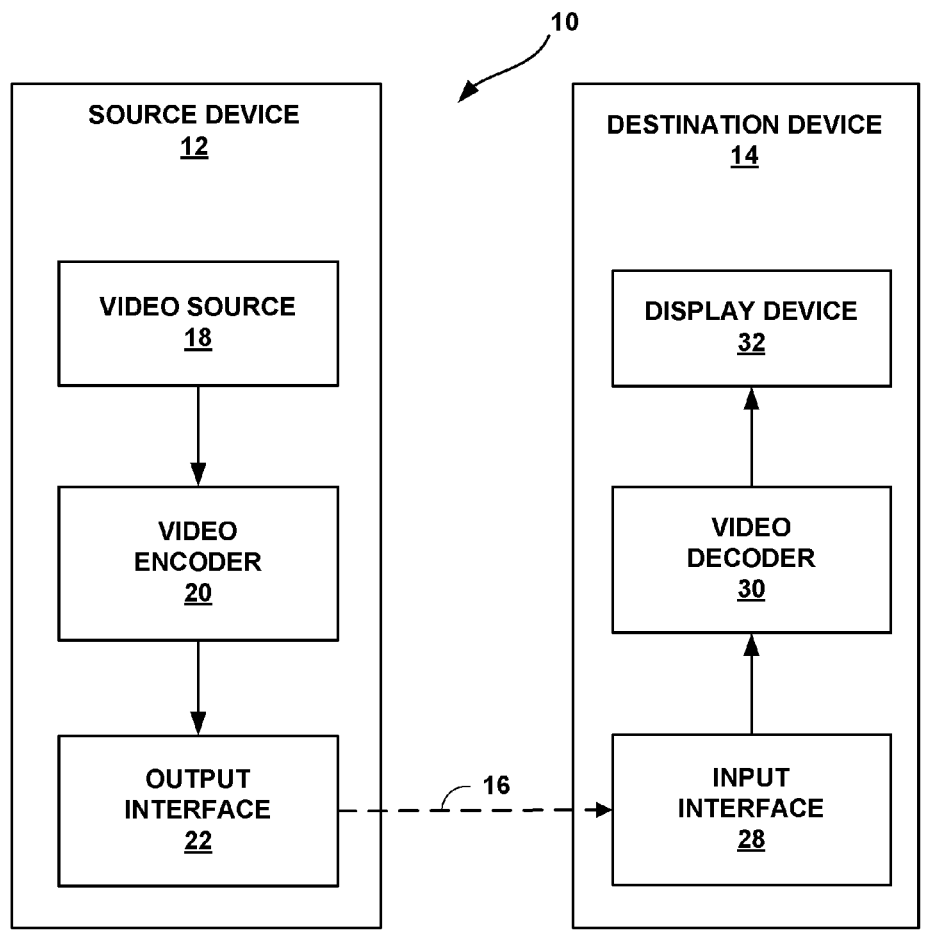
FIG. 1 is a block diagram illustrating an example video encoding and decoding system that may utilize techniques in accordance with aspects described in this disclosure.

The techniques described in this disclosure generally relate to scalable video coding (SVC) and multiview/3D video coding. For example, the techniques may be related to, and used with or within, a High Efficiency Video Coding (HEVC) scalable video coding (SVC) extension. In an SVC extension, there could be multiple layers of video information. The layer at the very bottom level may serve as a base layer (BL) or reference layer (RL), and the layer at the very top may serve as an enhanced layer (EL). The "enhanced layer" is sometimes referred to as an "enhancement layer," and these terms may be used interchangeably. All layers in the middle may serve as either or both ELs or BLs. For example, a layer in the middle may be an EL for the layers below it, such as the base layer or any intervening enhancement layers, and at the same time serve as a BL for the enhancement layers above it.

For purposes of illustration only, the techniques described in the disclosure are described with examples including only two layers (e.g., lower level layer such as the base layer, and a higher level layer such as the enhanced layer). It should be understood that the examples described in this disclosure can be extended to examples with multiple base layers and enhancement layers as well. In addition, for ease of explanation, the following disclosure mainly uses the terms "frames" or "blocks." However, these terms are not meant to be limiting. For example, the techniques described below can be used with different video units, such as blocks (e.g., CU, PU, TU, macroblocks, etc.), slices, pictures, etc.

To use base layer motion information as candidates for enhancement layer coding, modification of merge or AMVP motion vector candidate list generation, or any other candidate list generation, for enhancement layer coding may be required. For example, modification of enhancement layer coding may be required when base layer motion vector candidate is added into the candidate list of the enhancement layer block. Hence, techniques for efficiently utilizing the base layer block motion information in forming a merge or AMVP list for a current block at enhancement layer may be needed.

Certain embodiments described herein reduce computational complexity by determining, in a base-layer inter-layer prediction mode, a merge list or an AMVP list for an enhancement layer block based only on motion information associated with the base layer block, the motion information comprising one or more motion information candidates. For example, the current block at an enhancement layer may use the same Merge/AMVP list that would be created in normal Merge/AMVP modes for its collocated base layer block. Also, motion vector scaling can be performed depending on the spatial scalability ratio.

Video Coding Standards

Certain embodiments described herein relate to inter-layer prediction for scalable video coding in the context of advanced video codecs, such as HEVC (High Efficiency Video Coding). More specifically, the present disclosure relates to systems and methods for improved performance of inter-layer prediction in scalable video coding (SVC) extension of HEVC. In the description below, H.264/AVC techniques related to certain embodiments are described; the HEVC standard and related techniques are also discussed. While certain embodiments are described herein in the context of the HEVC and/or H.264 standards, one having ordinary skill in the art may appreciate that systems and methods disclosed herein may be applicable to any suitable video coding standard. For example, embodiments disclosed herein may be applicable to one or more of the following standards: ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

Scalable video coding (SVC) may be used to provide quality (also referred to as signal-to-noise (SNR)) scalability, spatial scalability and/or temporal scalability. For example, in one embodiment, a reference layer (e.g., a base layer) includes video information sufficient to display a video at a first quality level and the enhancement layer includes additional video information relative to the reference layer such that the reference layer and the enhancement layer together include video information sufficient to display the video at a second quality level higher than the first level (e.g., less noise, greater resolution, better frame rate, etc.). An enhanced layer may have different spatial resolution than base layer. For example, the spatial aspect ratio between EL and BL can be 1.0, 1.5, 2.0 or other different ratios. In other words, the spatial aspect of the EL may equal 1.0, 1.5, or 2.0 times the spatial aspect of the BL. In some examples, the scaling factor of the EL may be greater than the BL. For example, a size of pictures in the EL may be greater than a size of pictures in the BL. In this way, it may be possible, although not a limitation, that the spatial resolution of the EL is larger than the spatial resolution of the BL.

In the SVC extension for H.264, prediction of a current block may be performed using the different layers that are provided for SVC. Such prediction may be referred to as inter-layer prediction. Inter-layer prediction methods may be utilized in SVC in order to reduce inter-layer redundancy. Some examples of inter-layer prediction may include inter-layer intra prediction, inter-layer motion prediction, inter-layer mode prediction, and inter-layer residual prediction. Inter-layer intra prediction uses the reconstruction of collocated blocks in the base layer to predict the current block in the enhancement layer. Inter-layer motion prediction uses motion of the base layer to predict motion in the enhancement layer. Inter-layer mode prediction predicts the mode in the enhancement layer based on the mode in the base layer. Inter-layer residual prediction uses the residue of the base layer to predict the residue of the enhancement layer.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

FIG. 1 is a block diagram illustrating an example video encoding and decoding system that may utilize techniques in accordance with aspects described in this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In addition, in some embodiments, system 10 can be implemented in a single device. For example, any such single device, including a telephone handset, may comprise both source device 12 and destination device 14, as well as computer-readable medium 16. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. In some embodiments, a wireless communication device, such as a cellular telephone, can comprise source device 12, including video source 18, video encoder 20, and output interface 22. Destination device 14 includes input interface 28, video decoder 30, and display device 32. In some embodiments, a wireless communication device, such as a cellular telephone, can comprise destination device 14, including input interface 28, video decoder 30, and display device 32. For example, in some cases, a single wireless communication device can comprise both source device 12 and destination device 14. In accordance with this disclosure, video encoder 20 of source device 12 may be configured to apply the techniques for coding a bitstream including video data conforming to multiple standards or standard extensions. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for determining candidates for a candidate list for motion vector predictors for a current block may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. For example, in some embodiments in which source device 12 and destination device 14 are implemented as a single device, such as a wireless handset, computer-readable medium 16 can include any storage media. In some examples, a network server (not shown) may receive encoded video data from source device 12 and provide the encoded video data to destination device 14, e.g., via network transmission, direct wired communication, etc. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard, including but not limited to any of the standards listed above. Other examples of video coding standards include MPEG-2 and ITU-T H.263. In some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up," "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks may not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization is a broad term intended to have its broadest ordinary meaning. In one embodiment, quantization refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Figure 2:
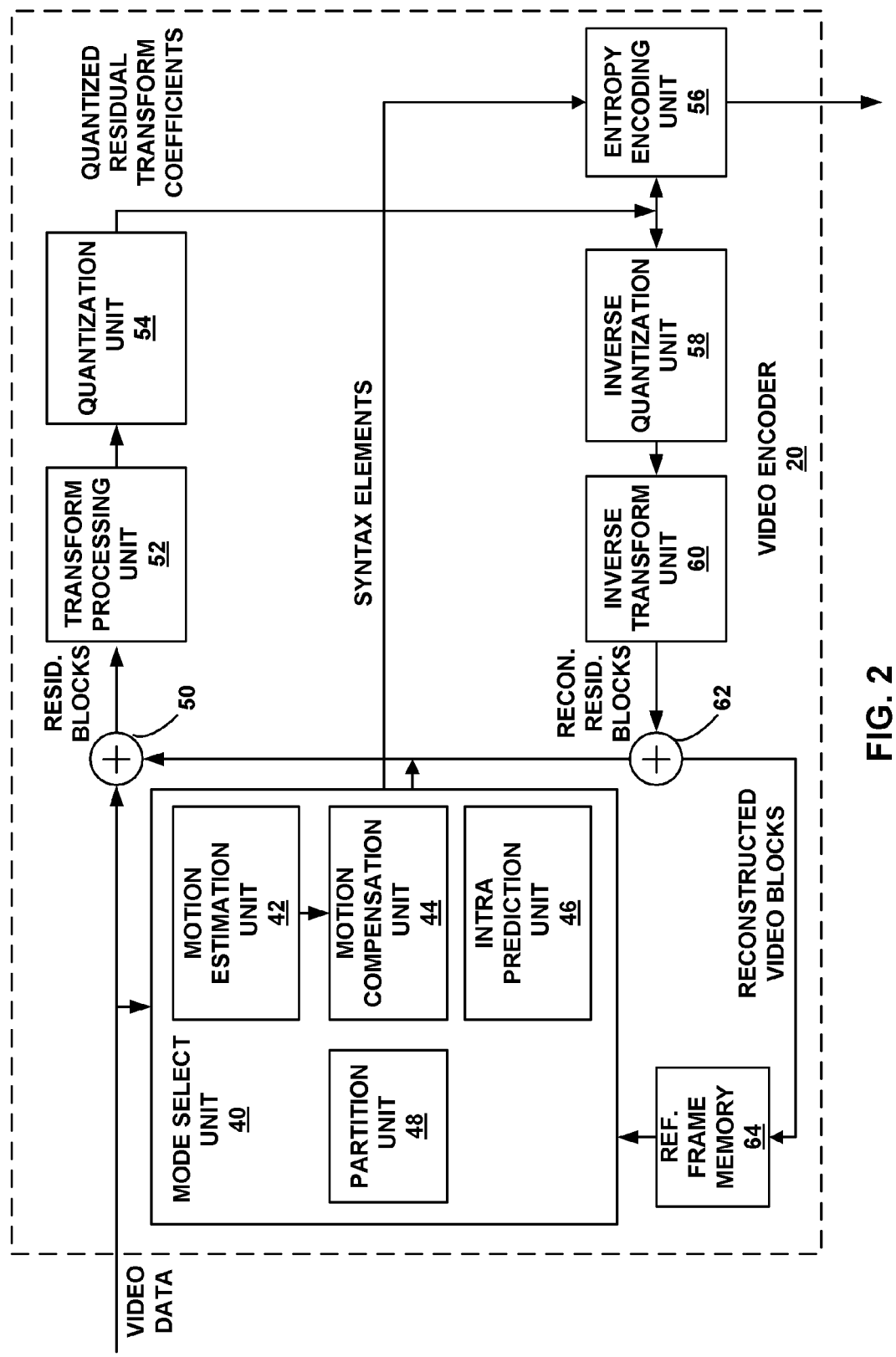
FIG. 2 is a block diagram illustrating an example of a video encoder that may implement techniques in accordance with aspects described in this disclosure.

FIG. 2 is a block diagram illustrating an example of a video encoder that may implement techniques in accordance with aspects described in this disclosure. Video encoder 20 may be configured to perform any or all of the techniques of this disclosure. As one example, mode select unit 40 may be configured to perform any or all of the techniques described in this disclosure. However, aspects of this disclosure are not so limited. In some examples, the techniques described in this disclosure, including the methods described below with respect to FIG. 9, may be shared among the various components of video encoder 20. In some examples, in addition to or instead of, a processor (not shown) may be configured to perform any or all of the techniques described in this disclosure.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 1, video encoder 20 includes mode select unit 40, reference frame memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict or calculate a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Figure 3:
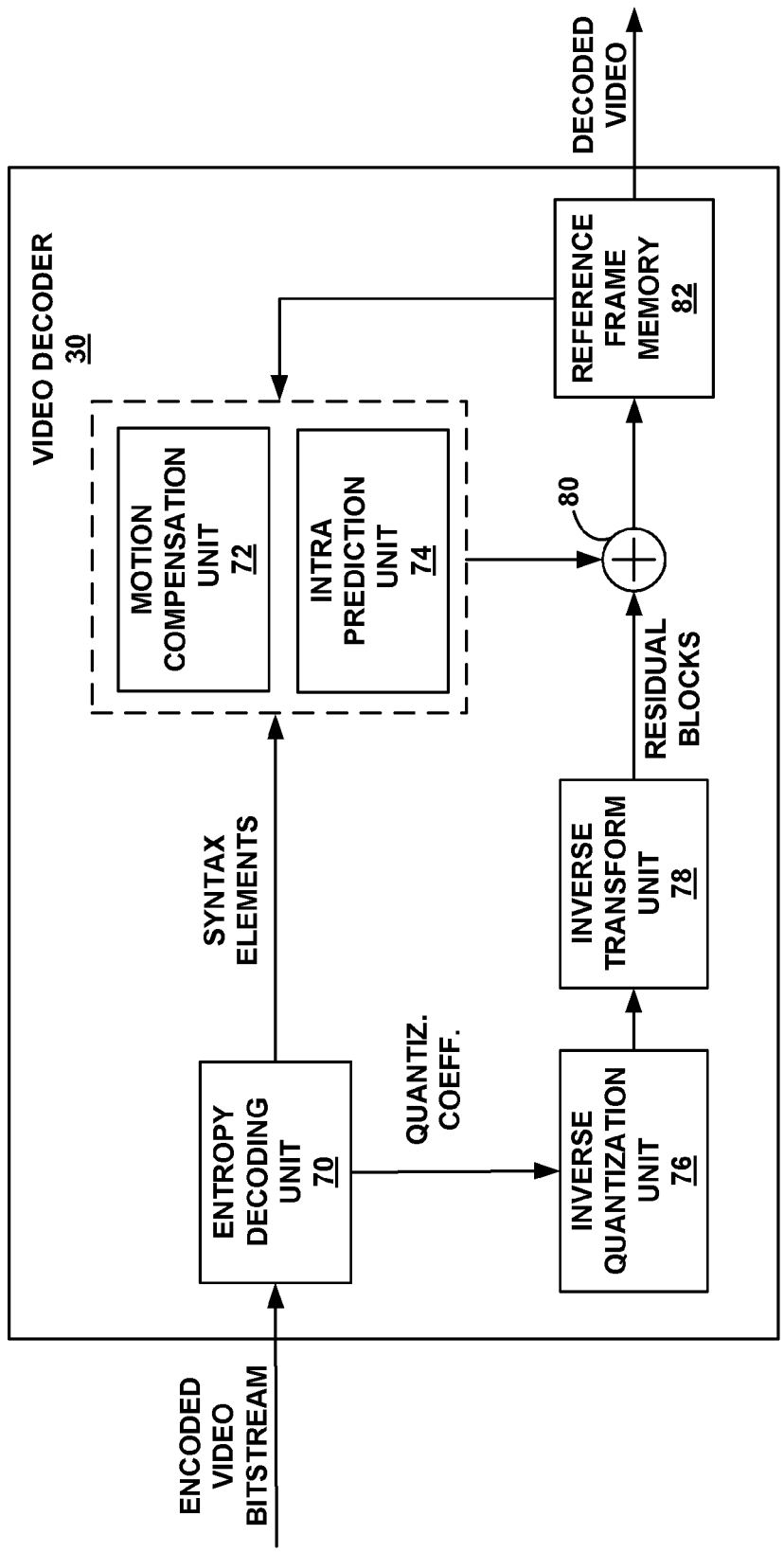
FIG. 3 is a block diagram illustrating an example of a video decoder that may implement techniques in accordance with aspects described in this disclosure.

FIG. 3 is a block diagram illustrating an example of a video decoder that may implement techniques in accordance with aspects described in this disclosure. Video decoder 30 may be configured to perform any or all of the techniques of this disclosure, including the methods described below with respect to FIG. 9. As one example, motion compensation unit 72 and/or intra prediction unit 74 may be configured to perform any or all of the techniques described in this disclosure. However, aspects of this disclosure are not so limited. In some examples, the techniques described in this disclosure may be shared among the various components of video decoder 30. In some examples, in addition to or instead of, a processor (not shown) may be configured to perform any or all of the techniques described in this disclosure.

In the example of FIG. 3, video decoder 30 includes an entropy decoding unit 70, motion compensation unit 72, intra prediction unit 74, inverse quantization unit 76, inverse transformation unit 78, reference frame memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (e.g., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 92. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, e.g., de-quantizes, the quantized transform coefficients provided in the bitstream and decoded by entropy decoding unit 80. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference frame memory 82 also stores decoded video for later presentation on a display device, such as display device 32 of FIG. 1.

Motion Compensation in HEVC

As mentioned above, HEVC is the next generation of video coding standard. In general, HEVC follows the framework of previous video coding standards. The motion compensation loop of HEVC can be kept the same as that in H.264/AVC, i.e., the reconstruction of the current frame Î equals de-quantized coefficients r plus temporal prediction P:

$$\hat{I} = r + P \quad (1)$$

where P indicates uni-directional prediction for P frames or slices or bi-directional prediction for B frames or slices.

The unit of motion compensation in HEVC can be different from that in previous video coding standards. In fact, the concept of macroblock in previous video coding standards does not exist in HEVC. Instead, the macroblock concept is replaced by a highly flexible hierarchical structure based on a generic quadtree scheme. Within this scheme, three types of blocks, i.e., Coding Unit (CU), Prediction Unit (PU), and Transform Unit (TU), are defined. CU is the basic unit of region splitting. CU is analogous to the concept of macroblock, but it does not restrict the maximum size and it allows recursive splitting into four equal size CUs to improve the content adaptivity. PU is the basic unit of inter/intra prediction and it may contain multiple arbitrary shape partitions in a single PU to effectively code irregular image patterns. TU is the basic unit of transform. It can be defined independently from the PU; however, its size is limited to the CU which the TU belongs to. This separation of the block structure into three different concepts allows each to be optimized according to its role, which results in the improved coding efficiency.

Motion Prediction in HEVC

In HEVC, there is an inter-prediction mode called "Merge." Merge mode refers to one or more video coding modes in which motion information of a neighboring video block are inherited for a current video block being coded. An index value may be used to identify the candidate from which the current video block inherits its motion information (e.g., a top, top right, left, left bottom block, relative to the current block, a co-located block from a temporally adjacent frame or artificial motion vector candidates). Skip mode may comprise one type of merge mode (or a mode similar to merge mode). With skip mode, motion information is inherited, but no residual information is coded. Residual information may generally refer to pixel difference information indicating pixel differences between the block to be coded and the block from which the motion information is inherited. Inter Merge mode may be another type of merge mode (or mode similar to merge mode). Inter Merge mode may be similar to skip mode in that motion information is inherited, but with Inter Merge mode, a video block is coded to include residual information. The phrase "merge mode" is used herein to refer to any one of these modes, which may be called skip mode, Inter Merge mode or merge mode.

Motion information can include at least motion vectors, reference frame indexes and inter prediction directions associated with a block. More specifically, to code a current block, a list of merge candidates may be formed based on motion information from spatially and/or temporally neighboring blocks and artificial motion vector candidates. Instead of signaling the motion information of a current block directly, an index of the merge list is signaled from encoder to decoder. At the decoder side, the same merge list can be constructed. Based on the received index, the decoder can look up the motion information from the merge list and use it as the motion information for the current block.

Figure 4:
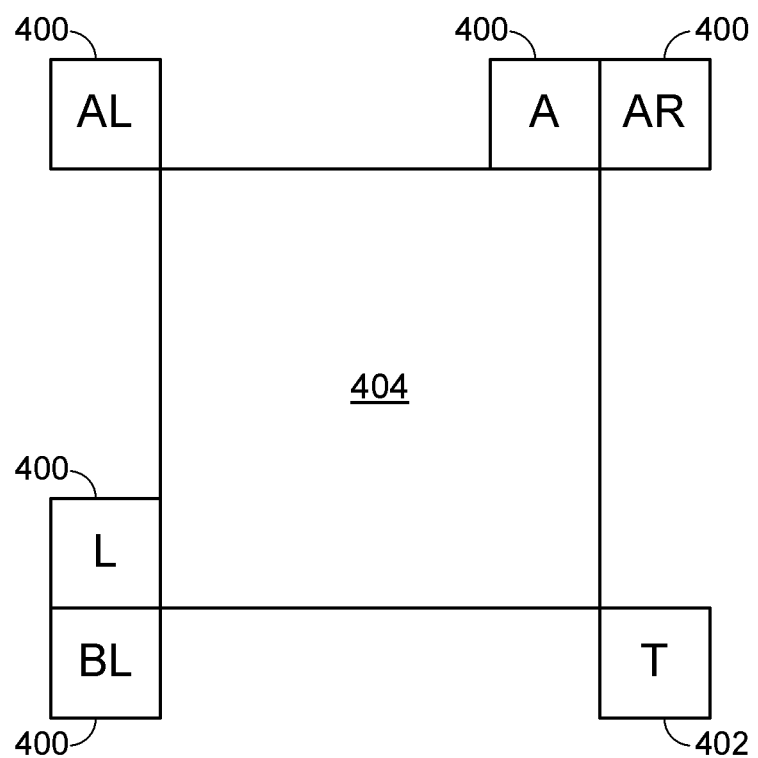
FIG. 4 is a conceptual diagram that shows example spatial and temporal neighboring blocks where motion information is retrieved in forming a candidate list for video coding.

FIG. 4 is a conceptual diagram that shows example spatial 400 and temporal 402 neighboring blocks to a current block 404, where motion information is retrieved in forming a merge list for video coding the current block 404. In the example of FIG. 4, there are five spatial neighboring blocks 400 and one temporal neighboring block 402. The five spatial neighboring blocks 400 are the left block (L), above block (A), above right block (AR), bottom left block (BL) and above left block (AL). One temporal neighboring block 402 is denoted as T. A collocated block (not shown) of the current block 406 located in one of its reference frames is used to retrieve motion information.

In certain situations, motion information of a spatial 400 or temporal 402 neighboring block may not be available. For example, the block 400, 402 may be located outside the border of the current picture or the current slice or the current tile. Or, the block 400, 402 may be intra-coded and therefore may not have any motion information associated with it. When motion information of one or more spatial 400 or temporal 402 neighboring blocks is not available, there may not be enough motion information candidates in the merge list. In this case, artificial motion information candidates may be generated through "partial combination" based on existing motion information candidates that are already in the list. For example, for existing motion information candidate A and B, the L0 (i.e., list 0) motion vector of candidate A may be combined with the L1 (i.e., list 1) motion vector of candidate B to create a new and artificial motion information candidate. In some other examples, zero motion vectors can also be used to generate new motion information candidates. These artificial motion information candidates are put into the merge list until the list is full.

A pruning operation can sometimes performed on a motion information candidate before putting the motion information candidate into the merge list. During the pruning operation, a motion information candidate is compared with one or more existing motion information candidates in the list, and excluded from the list if the motion information candidate is equal to an existing candidate in the merge list.

Motion Vector Prediction

Another case where the motion vector of a neighboring video block is used in the coding of a current video block is so-called motion vector prediction or advanced motion vector prediction (AMVP). In these cases, predictive coding of motion vectors is applied to reduce the amount of data needed to communicate the motion vector. For example, rather than encoding and communicating the motion vector itself, video encoder 20 encodes and communicates a motion vector difference (MVD) relative to a known (or knowable) motion vector. In H.264/AVC, the known motion vector, which may be used with the MVD to define the current motion vector, can be defined by a so-called motion vector predictor (MVP), which is derived as the median of motion vectors associated with neighboring blocks.

However, more advanced MVP techniques, such as AMVP may allow video encoder 20 to select the neighbor from which to define the MVP. That is, a video coder may generate a merge/AMVP list that includes a plurality of motion information candidates. The video coder may then select one of the motion information candidates. The MVP may be defined based on a motion vector of the selected motion information candidate. The use of AMVP may refer to the use of motion vector information from another block, with the use of an MVD value to indicate the differences between the MVP and the actual MV of the block to be coded and reference index signaled. Alternatively, the use of merge mode may refer to the use of motion information from another block to code a current block, with or without residual information indicating pixel differences between the block to be coded and the other block. Techniques of this disclosure may be applicable for generating a candidate list for merge mode and/or AMVP.

When there are multiple candidates in the MVP list, an index can be signaled to indicate which candidate is to be used. Similar to the merge list, in SVC and 3D video coding of HEVC, the motion information of a collocated block in base layer or base view may be put into the MVP list.

Figure 5:
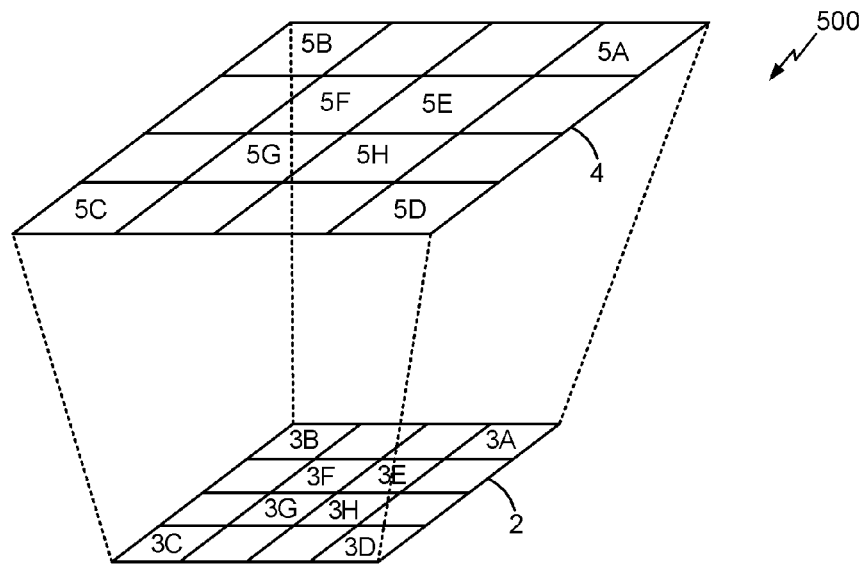
FIG. 5 is a conceptual diagram illustrating an example of blocks in multiple layers in scalable video coding (SVC).

FIG. 5 is a conceptual diagram illustrating an example of blocks in multiple layers in SVC. For example, FIG. 5 illustrates a base layer block 2 and an enhanced layer block 4, which may be co-located with one another such that the base layer block 2 can be located at a position in the base layer corresponding to the position of the enhanced layer block 4 in the enhancement layer.

Base layer block 2 includes sub-blocks 3A-3H, and enhanced layer block 4 includes sub-blocks 5A-5H. Each of sub-blocks 3A-3H may be co-located with each of sub-blocks 5A-5H, respectively. For example, each of sub-blocks 3A-3H may correspond to a respective one of sub-blocks 5A-5H. In some coders, the motion information from the top left sub-block (e.g., sub-block 3B) may be used to predict the motion information for enhanced layer block 4. However, this sub-block may be less optimal than other sub-blocks in some instances.

In certain embodiments, an advantage of using motion information of the base layer for enhanced layer coding is that other locations within the co-located base layer block may be distinct, which can enable better or different predictions for EL motion information. For instance, rather than of using the top left 4×4 block or pixel as a location for deriving base layer motion information inside a co-located block (e.g., using sub-block 3B of base layer block 2), other 4×4 block or pixel locations within the co-located base layer block can also be used. For example, it may be desirable to use corners in the top right (e.g., sub-block 3A), bottom left (e.g., sub-block 3C), bottom right (e.g., sub-block 3D), center (e.g., one of sub-blocks 3E, 3F, 3G, 3H), or another of the sub-blocks inside co-located base layer block 2. Furthermore, although the examples describe the sub-blocks to be 4×4, aspects of this disclosure extend to sub-blocks of any other sizes, such as 8×8 and 16×16 or the like.

In some embodiments, the location of the sub-block in the corresponding base layer co-located block can be fixed and/or dependent on one or more factors, such as a largest coding unit (LCU), a coding unit (CU), a prediction unit (PU), transform unit (TU) sizes, an inter direction mode, a partition mode, an amplitude of motion vector or motion vector difference, a reference index, a merge flag, a skip mode, a prediction mode, a physical location of the base and enhanced layer blocks within the pictures, or the like.

In some embodiments, the motion information can be derived jointly from two or more sub-block locations or pixels inside the co-located base layer block, using operations or functions such as an average, weighted average, median, or the like. For example, as shown in FIG. 1, five locations indicated with reference numerals 3A-3H may all be considered and the average or median value of their motion information (e.g., such as average or median values of x and y displacement values of the motion vectors) may be used as the motion information from co-located base layer block in predicting enhanced layer motion information.

Scalable Video Coding

Figure 6:
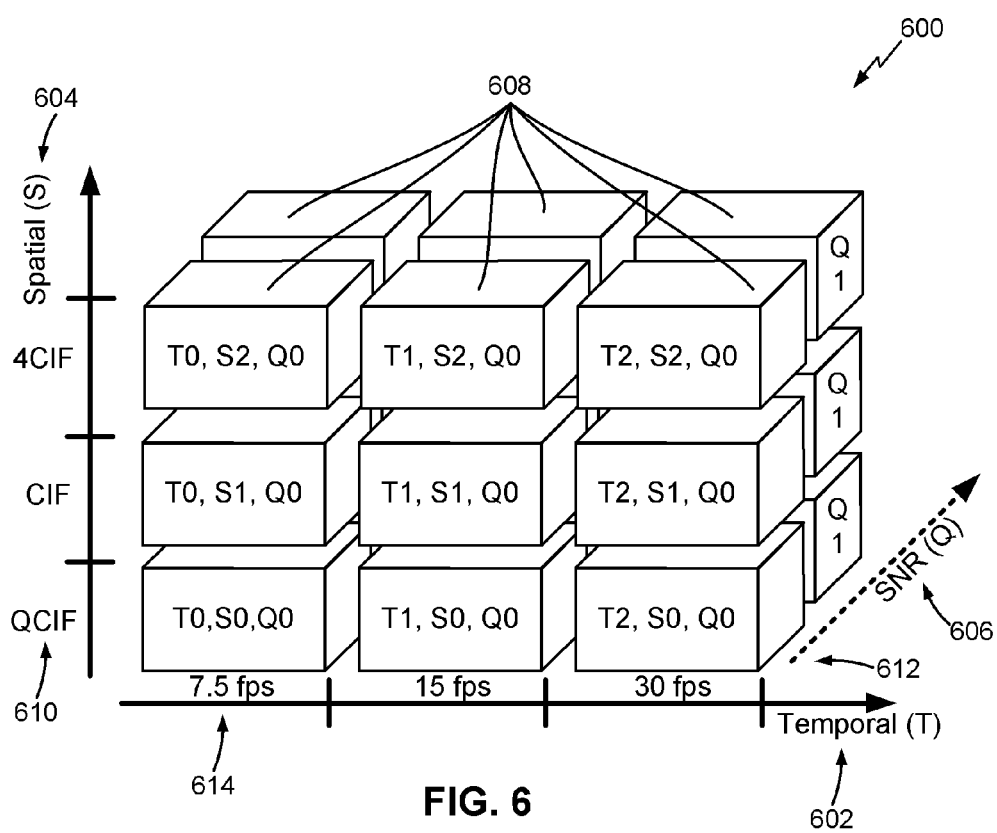
FIG. 6 is a block diagram illustrating scalabilities in three different dimensions according to aspects of this disclosure.

An example of scalabilities 600 in different dimensions is shown in FIG. 6. In the example, scalabilities are enabled in three dimensions 602, 604, 606. In a time dimension 602, frame rates with 7.5 Hz, 15 Hz or 30 Hz can be supported by temporal scalability (T). When spatial scalability (S) 604 is supported, different resolutions such as QCIF, CIF and 4CIF are enabled. For each specific spatial resolution and frame rate, the SNR (Q) layers 606 can be added to improve the picture quality. Bitstreams from each layer 602, 604, 606 can be multiplexed together into a single bitstream. Once video content has been encoded in such a scalable way, an extractor tool may be used to adapt the actual delivered content according to application requirements, which are dependent e.g., on the clients or the transmission channel. In the example shown in FIG. 6, each cubic 608 contains the pictures with the same frame rate (temporal level), spatial resolution and SNR layers. Better representation can be achieved by adding those cubes 608 (pictures) in any dimension 602, 604, 606. Combined scalability is supported when there are two, three or even more scalabilities enabled.

According to the SVC specification, the pictures with the lowest spatial 610 and quality 612 layer are compatible with H.264/AVC, and the pictures at the lowest temporal level 614 form the temporal base layer, which can be enhanced with pictures at higher temporal levels. In addition to the H.264/AVC compatible layer, several spatial and/or SNR enhancement layers can be added to provide spatial and/or quality scalabilities. SNR scalability 606 is also referred as quality scalability. Each spatial 604 or SNR 606 enhancement layer itself may be temporally scalable, with the same temporal scalability structure as the H.264/AVC compatible layer. For one spatial or SNR enhancement layer, the lower layer it depends on is also referred as the base layer of that specific spatial or SNR enhancement layer.

Figure 7:
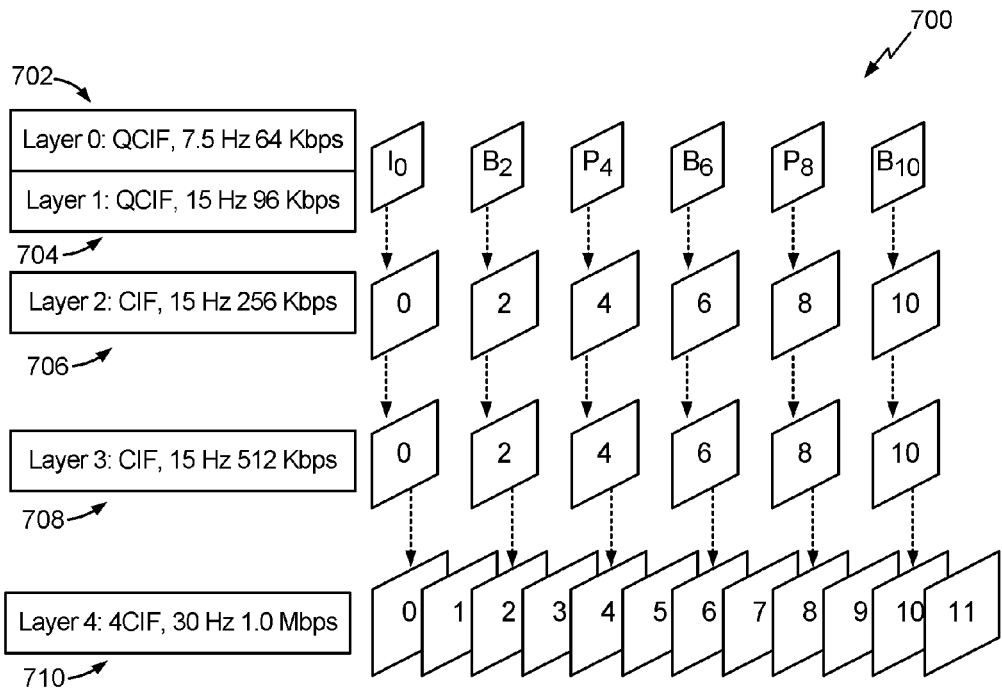
FIG. 7 is a block diagram illustrating an example structure of an SVC bitstream according to aspects of this disclosure.

An example of SVC coding structure 700 is shown in FIG. 7. The pictures with the lowest spatial and quality layer (pictures in layer 0 702 and layer 1 704, with QCIF resolution) are compatible with H.264/AVC. Among them, those pictures of the lowest temporal level form the temporal base layer, as shown in layer 0 702 of FIG. 7. This temporal base layer (layer 0) 702 can be enhanced with pictures of higher temporal levels (layer 1) 704. In addition to the H.264/AVC compatible layer 704, several spatial and/or SNR enhancement layers 706, 708, 710 can be added to provide spatial and/or quality scalabilities. For instance, the enhancement layer can be a CIF representation with the same resolution as layer 2 706. In the example, layer 3 708 is a SNR enhancement layer. As shown in the example, each spatial or SNR enhancement layer itself may be temporally scalable, with the same temporal scalability structure as the H.264/AVC compatible layer. Also, an enhancement layer can enhance both spatial resolution and frame rate. For example, layer 4 710 provides a 4CIF enhancement layer, which further increases the frame rate from 15 Hz to 30 Hz.

Figure 8:
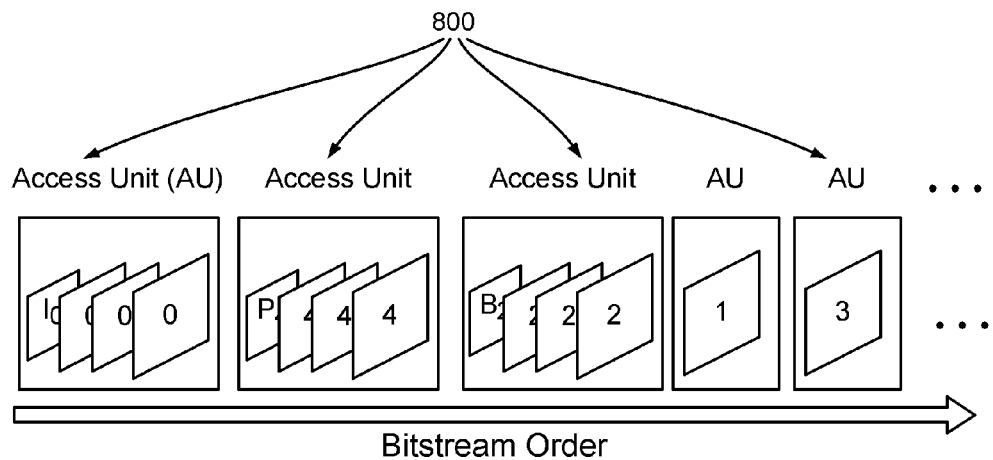
FIG. 8 is a block diagram illustrating example SVC access units in a bitstream according to aspects of this disclosure.

As shown in FIG. 8, the coded slices in the same time instance are successive in the bitstream order and form one access unit 800 in the context of SVC. Those SVC access units 800 then follow the decoding order, which could be different from the display order and decided e.g., by the temporal prediction relationship.

Features of Scalable Extensions of H.264/AVC

Some functionalities of SVC are inherited from H.264/AVC. Compared with previous scalable standards, the most important advantages, namely inter-layer prediction and single-loop decoding are reviewed below.

To keep a low-complexity decoder, single-loop decoding is mandatory in SVC. With single-loop decoding, each supported layer can be decoded with a single motion compensation loop. To achieve this, the usage of inter-layer intra-prediction is only allowed for enhancement layer macroblocks (MB), for which the collocated reference layer signal is intra-coded. It is further required that all layers that are used to inter-layer predict higher layers are coded using constrained intra-prediction.

SVC introduces inter-layer prediction for spatial and SNR scalabilities based on texture, residue, mode and motion. Spatial scalability in SVC has been generalized to any resolution ratio between two layers. SNR scalability can be realized by Coarse Granularity Scalability (CGS) or Medium Granularity Scalability (MGS). In SVC, two spatial or CGS layers belong to different dependency layers (indicated by dependency_id in NAL unit header), while two MGS layers can be in the same dependency layer. One dependency layer includes quality layers with quality_id from 0 to higher values, corresponding to quality enhancement layers. In SVC, inter-layer prediction methods are utilized to reduce inter-layer redundancy. They are briefly introduced in the following paragraphs.

The coding mode using inter-layer intra prediction is called "IntraBL" mode in SVC. To enable single-loop decoding, only the MBs, which have collocated MBs in the base layer coded as constrained intra modes, can use inter-layer intra prediction mode. A constrained intra mode MB is intra-coded without referring to any samples from neighboring inter-coded MBs.

If an MB is indicated to use residual prediction, the collocated MB in the base layer for inter-layer prediction must be an inter MB and its residue may be upsampled according to the spatial resolution ratio. The residue difference between the enhancement layer and that of the base layer is coded. That is, the reconstruction of the current frame $I_e$ of the enhancement layer equals the sum of de-quantized coefficients $r_e$ of the enhancement layer, the temporal prediction $P_e$ from the enhancement layer, and the quantization normalized residual coefficients $r_b$ of the base layer.

$$I_e = r_e + P_e + r_b$$

The collocated base layer motion vectors may be scaled to generate predictors for the motion vectors of MB or MB partition in the enhancement layer. In addition, there is one MB type named base mode, which sends one flag for each MB. If this flag is true and the corresponding base layer MB is not intra, then motion vectors, partitioning modes and reference indices are all derived from base layer.

Inter-Layer Merge List Construction

To use base layer motion information as candidates for enhancement layer coding, modification of merge or AMVP list generation for enhancement layer coding may be required. Hence, techniques for efficiently utilizing the base layer block motion information in forming a merge or AMVP list for a current block at enhancement layer may be needed.

Figure 9:
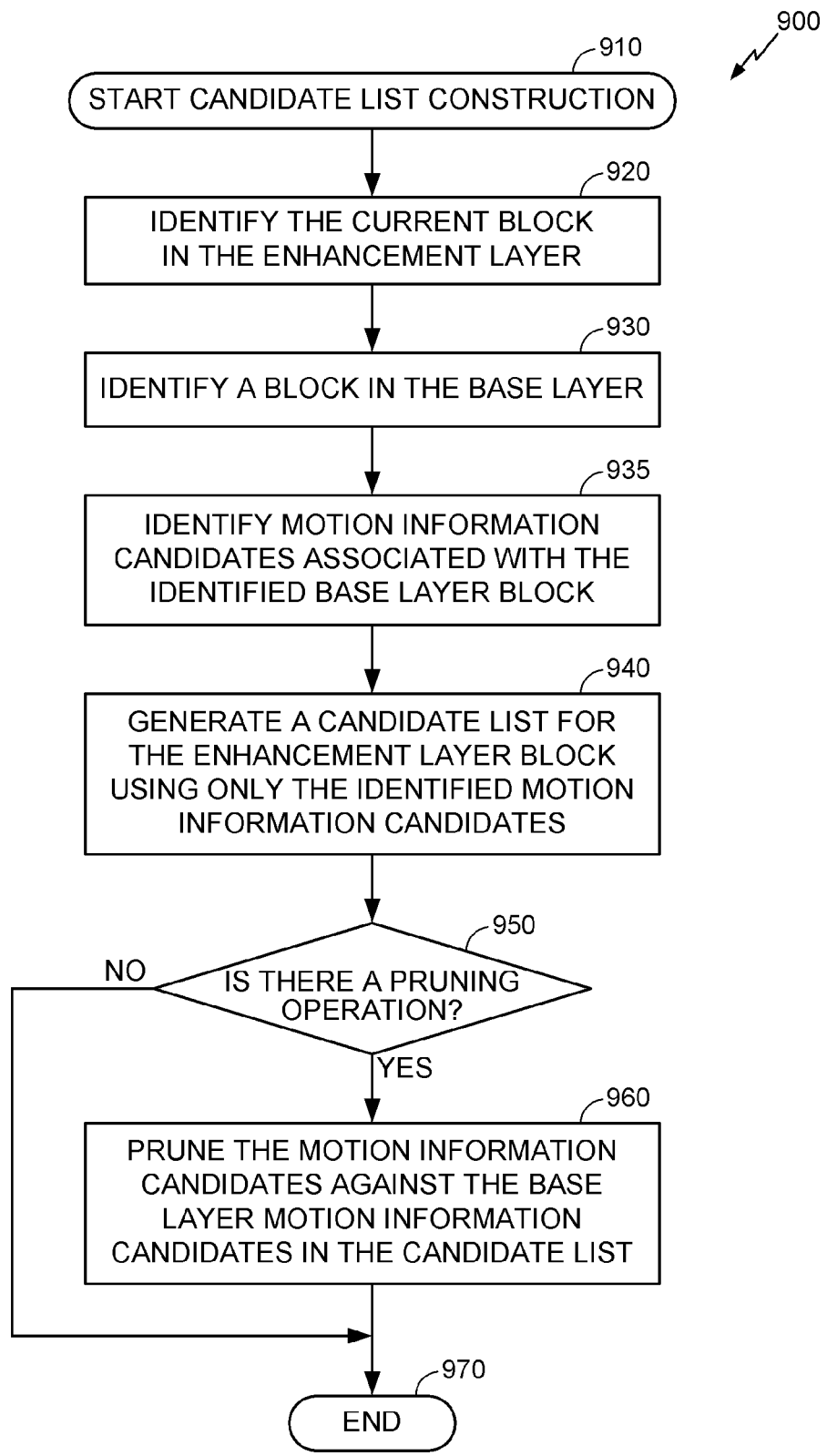
FIG. 9 is a flowchart illustrating one embodiment of a method for constructing a merge/AMVP candidate list according to aspects of this disclosure.

FIG. 9 depicts a flowchart describing one embodiment of candidate list construction 900 for an enhancement layer block. For example, a candidate list can be a merge list or an AMVP list. After start of the candidate list construction routine at 910, the current block of the enhancement layer is identified in 920. Next, a block in the base layer is identified at 930. The base layer block may be a block in the base layer that is corresponding to the current enhancement layer block, or it may be a sub-block. For example, any of the techniques for identifying a sub-block described with respect to FIG. 5 may be used. In one embodiment, the base layer block is collocated with respect to the current enhancement layer block, although it need not be. At 935, the motion information candidates associated with the base layer block are identified. Next, at 940, a candidate list for the enhancement layer block is generated using only the identified motion information candidates associated with the base layer block. For example, the candidate list for the enhancement layer block may use the same Merge/AMVP list that would be created in normal Merge/AMVP modes for its corresponding base layer block. If there is a pruning operation 950, any redundancies in the motion information candidates in the candidate list can be selectively pruned 960. Once the motion information candidates have been added to the candidate list and any redundancies pruned, the candidate list construction routine is finished 970.

In one embodiment, a video coder (i.e., a video encoder or a video decoder) may generate a candidate list for an enhancement layer block based only on motion information of a base layer block. The base layer block may be in a base layer of the video data and the enhancement layer block may be in an enhancement layer of the video data. In some examples, the base layer block is collocated with the enhancement layer block. If the video coder is a video encoder, the video encoder may output a reference index that indicates a motion information candidate in the candidate list. If the video coder is a video decoder, the video decoder may use a motion information candidate indicated by a reference index to generate a predicted video block for the enhancement layer block.

In one embodiment, separate prediction modes can be named as BL Merge mode and BL AMVP mode. In the BL Merge mode, BL motion information, including motion vectors and reference indices, can be used for EL inter prediction. In BL AMVP mode, BL motion vectors can be used for EL prediction and reference index can be additionally signaled.

The location of the base layer block where base layer motion information can be obtained can vary. Base layer motion information can be obtained from the co-located block in the base layer, or from a sub-block of the co-located block in the base layer. In addition, multiple base layer motion candidates can be used in the BL Merge/AMVP modes. For example, any sub-block of the BL block can be used for BL motion information to be used as candidates in these new modes. For example, 4 corners and 4 centers, or generally any BL sub-blocks, can be used, as described above with respect to FIG. 5.

In addition, the temporal base layer motion vector candidate can be used in any of these modes. The BL TMVP candidate can be indicated with a flag in any of the slice, sequence or picture headers. In some embodiments, the base layer motion information can be scaled according to a spatial resolution ratio between the base layer and the enhancement layer. In addition, a pruning process can be applied to complete the BL Merge/AMVP candidate lists. Artificial candidate generation also may be applied to complete the BL Merge/AMVP candidate lists.

Also, a skip version of BL Merge and BL AMVP modes can be used. For example, a residual can be set or assumed to be equal to zero. As such, in skip mode, there is no transform coefficient coding. The skip mode can be fixed or signaled in at least one of PU/CU/LCU, group of blocks levels, slice, picture or sequence headers.

The new BL Merge and AMVP modes, as well as its skipped versions, can be coupled with other interlayer prediction modes, and additional flags and mode controls parameter can be signaled for these newly introduced modes. For example, generalized residual prediction (GRP), multi-hypothesis mode, combined modes and other possible prediction modes can be used with BL Merge/AMVP modes skip and non-skip versions.

The number of candidates used for BL Merge and AMVP modes can be fixed, derived or signaled in slice headers or other headers. For example, it can be just one candidate for both BL Merge and AMVP modes. Alternatively, the number of candidates used can be 5 for BL Merge mode and 2 for BL AMVP mode, among other possible variations.

If number of motion information candidates is greater than one, the candidate index can be signaled to the decoder to indicate which candidate in the list is used for enhancement layer prediction. If a maximum number of candidates is known, for example, truncated unary binarization or exponential Golomb binarization can be used in BL Merge/AMVP candidate index coding. Some of the binarization bins can be CABAC bypassed coded, for example first or first and second bins can be context coded, and the rest is bypassed coded. Each own context can be used for every bin, or some of the context can be shared for some bins.

In BL AMPV mode, a reference index used for prediction can be signaled. The HEVC coding style for the reference index and Merge/AMVP index can be used to share already existed logic. If the mode is bi-predicted, two BL AMVP indices and two reference indices can be signaled.

The BL Merge and AMVP modes, including the skip mode variations, can be indicated in at least one of the slice, picture or sequence headers.

To indicate which of the modes is used, in addition to a mode control flag signaled at least in one of the headers such as Video Parameter Set (VPS), Sequence Paramter Set (SPS), Picture Parameter Set (PPS), slice header or elsewhere, the BL_merge_flag can be signaled at the PU and/or CU levels. If the BL_merge_flag is enabled, then BL Merge can be applied. Otherwise, BL AMVP mode is used.

If in skip mode, for example BL Merge skip, BL_merge_flag may not be signaled. In this case, BL Merge skip can be applied at a CU level for a 2N×2N partition mode only. Other partition modes and AMVP skip mode are also possible.

The order in which a processor is configured to perform coding of the skip and non-skip BL Merge/AMPV modes can be different relative to already existed modes. For example, the mode ordering can be the following:

1. IntraBL skip mode
2. Merge/AMVP BL skip mode
3. Normal Merge skip mode
4. IntraBL mode
5. BL Merge/AMVP non-skip mode
6. Normal Merge/AMVP modes
7. Intra prediction mode As used herein, the word "normal" describes the modes that are used in HEVC standard. In some embodiments, the base-layer Merge/AMVP skip modes can be ordered after IntraBL skip mode. All skip modes, including IntraBL skip, BL Merge/AMVP skip, and normal skip mode, can be signaled in the beginning, as often they may be the most frequently used. The non-skip versions, including IntraBL, BL Merge/AMVP and Normal Merge/AMPV modes, can be grouped and ordered after the skip modes.

In other embodiments, other combinations of the modes and their order are also possible. For example, the BL Merge/AMVP and Normal Merge/AMVP skip and non-skip modes can be grouped as shown in the next example below. Also, additional flags can be signaled to indicate base layer or normal versions of the Merge/AMVP skip and non-skip modes. A first flag can be signaled to indicate whether normal or BL Merge/AMVP modes are applied, and a second flag can indicate whether BL or Normal mode is used.

In above example Merge/AMVP BL skip mode has a higher priority compared to normal Merge skip mode, and has shorter codeword. However, in the below example, Merge/AMVP BL skip mode has an equal priority compared to normal Merge skip mode.

For example, the order and grouping can be the following:
1. IntraBL skip mode
2. Merge/AMVP BL skip mode OR Normal Merge skip mode (additional flag)
3. IntraBL mode
4. BL Merge/AMVP non-skip mode OR Normal Merge/AMVP modes (additional flag)
5. Intra prediction mode In addition, in some embodiments, BL Merge/AMVP modes may not be available in cases when the corresponding base layer block doesn't have motion information at specified base layer sub-block locations, such as corners, centers, or generally any base layer sub-blocks. For example, if intra-coded, zero motion information may be assigned to the base layer block.

Alternatively, in the above example, BL Merge/AMVP modes can be marked as unavailable, and in this case BL_merge_flag, BL Merge/AMVP skip mode flag, BL Merge/AMVP mode flag related to the modes are not necessary to be coded and parsed.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Various examples have been described. These and other examples are within the scope of the following claims.

What is claimed is:

1. An apparatus configured to code video data, the apparatus comprising:
   a memory configured to store video data, the video data comprising a base layer block of a base layer; and
   a processor in communication with the memory, wherein in a base-layer inter-layer prediction mode the processor is configured to:
      determine a candidate list comprising a plurality of motion vector candidates for an enhancement layer block based only on motion information associated with the base layer block, the enhancement layer block being in an enhancement layer of the video data, the plurality of motion vector candidates comprising a first motion vector candidate corresponding to a first sub-block within the base layer block and a second motion vector candidate corresponding to a second sub-block within the base layer block that is different from the first sub-block; and predict the enhancement layer block in the base-layer inter-layer prediction mode based on at least one of the plurality of motion vector candidates.

2. The apparatus of claim 1, wherein the candidate list comprises a base layer merge list or a base layer advanced motion vector prediction (AMVP) list.

3. The apparatus of claim 1, wherein the base layer block is collocated with the enhancement layer block.

4. The apparatus of claim 1, wherein the first sub-block is a corner sub-block near a corner of the base layer block and the second sub-block is a center sub-block near a center of the base layer block.

5. The apparatus of claim 1, wherein the processor is further configured to generate a syntax element to indicate whether to apply the base-layer inter-layer prediction mode.

6. The apparatus of claim 1, wherein the processor is further configured to scale the motion information associated with the base layer block according to a spatial scalability ratio between the base layer and the enhancement layer.

7. The apparatus of claim 1, wherein in a skip mode the processor is further configured to set any residuals associated with the plurality of motion vector candidates equal to zero.

8. The apparatus of claim 7, wherein the processor is further configured to generate a syntax element to indicate whether to apply the skip mode.

9. The apparatus of claim 7, wherein the processor is further configured to signal coding modes in the following order: an IntraBL skip mode, the base-layer inter-layer prediction skip mode, a merge skip mode, an IntraBL mode, the base-layer inter-layer prediction non-skip mode, a merge mode, and an Intra prediction mode.

10. The apparatus of claim 1, wherein the processor is further configured to generate a syntax element to indicate which one of the plurality of motion vector candidates in the candidate list to use for prediction of the enhancement layer block.

11. The apparatus of claim 1, wherein the processor is further configured to selectively prune any redundancies in the plurality of motion vector candidates in the candidate list.

12. The apparatus of claim 1, wherein the apparatus comprises an encoder.

13. The apparatus of claim 1, wherein the apparatus comprises a decoder.

14. The apparatus of claim 1, the apparatus further comprising at least one of a digital television, digital direct broadcast system, wireless broadcast system, personal digital assistant (PDA), laptop or desktop computer, digital camera, digital recording device, digital media player, video gaming device, video game console, cellular or satellite radio telephone, and video teleconferencing device that comprises the memory and the processor.

15. A method of decoding video data, the method comprising:
receiving syntax elements extracted from an encoded video bit stream, wherein the syntax elements comprise information associated with a base layer block of a base layer of the video data;
determining, in a base-layer inter-layer prediction mode, a candidate list comprising a plurality of motion vector candidates for an enhancement layer block in a based layer inter-layer prediction mode, based only on motion information associated with the base layer block, the enhancement layer block being in an enhancement layer of the video data, the plurality of motion vector candidates comprising a first motion vector candidate corresponding to a first sub-block within the base layer block and a second motion vector candidate corresponding to a second sub-block within the base layer block that is different from the first sub-block; and
predicting the enhancement layer block in the base-layer inter-layer prediction mode based on at least one of the plurality of motion vector candidates.

16. The method of claim 15, wherein the candidate list comprises a base layer merge list or a base layer advanced motion vector prediction (AMVP) list.

17. The method of claim 15, wherein the base layer block is collocated with the enhancement layer block.

18. The method of claim 15, wherein the first sub-block is a corner sub-block near a corner of the base layer block and the second sub-block is a center sub-block near a center of the base layer block.

19. The method of claim 15, further comprising receiving a syntax element that indicates whether to apply the base-layer inter-layer prediction mode.

20. The method of claim 15, further comprising scaling the motion information associated with the base layer block according to a spatial scalability ratio between the base layer and the enhancement layer.

21. The method of claim 15, further comprising setting, in a skip mode, any residuals associated with the plurality of motion vector candidates equal to zero.

22. The method of claim 21, further comprising receiving a syntax element that indicates whether to apply the skip mode.

23. The method of claim 21, further comprising signaling coding modes in the following order: an IntraBL skip mode, the base-layer inter-layer prediction skip mode, a merge skip mode, an IntraBL mode, the base-layer inter-layer prediction non-skip mode, a merge mode, and an Intra prediction mode.

24. The method of claim 15, further comprising receiving a syntax element that indicates which one of the plurality of motion vector candidates in the candidate list to use for prediction of the enhancement layer block.

25. The method of claim 15, further comprising selectively pruning any redundancies in the plurality of motion vector candidates in the candidate list.

26. A video coding apparatus, comprising:
means for processing one or more syntax elements associated with a video bit stream, wherein the one or more syntax elements comprise information associated with a base layer block of a base layer of the video data;
means for determining, in a base-layer inter-layer prediction mode, a candidate list comprising a plurality of motion information associated with the base layer block, the enhancement layer block being in an enhancement layer of the video data, the plurality of motion vector candidates comprising a first motion vector candidate corresponding to a first sub-block within the base layer block and a second motion vector candidate corresponding to a second sub-block within the base layer block that is different from the first sub-block; and
means for predicting the enhancement layer block in the base-layer inter-layer prediction mode based on at least one of the plurality of motion vector candidates.

27. The video coding apparatus of claim 26, wherein the base layer block is collocated with the enhancement layer block.

28. The video coding apparatus of claim 26, further comprising means for setting, in a skip mode, any residuals associated with the plurality of motion vector candidates equal to zero.

29. Non-transitory physical computer storage having stored thereon code that when executed causes an apparatus to:
- receive information associated with a base layer block of a base layer of video data;
- determine, in a base-layer inter-layer prediction mode, a candidate list comprising a plurality of motion vector candidates for an enhancement layer block based only on motion information associated with the base layer block, the enhancement layer block being in an enhancement layer of the video data, the plurality of motion vector candidates comprising a first motion vector candidate corresponding to a first sub-block within the base layer block and a second motion vector candidate corresponding to a second sub-block within the base layer block that is different from the first sub-block; and
- predict the enhancement layer block in the base-layer inter-layer prediction mode based on at least one of the plurality of motion vector candidates.

30. The non-transitory physical computer storage of claim 29, wherein the base layer block is collocated with the enhancement layer block.

\* \* \* \* \*